UNITED STATES PATENT OFFICE.

CHARLES RAMSDEN DENTON, OF SHEFFIELD, ENGLAND.

ALLOY.

1,162,226. Specification of Letters Patent. Patented Nov. 30, 1915.

No Drawing. Application filed July 13, 1915. Serial No. 39,723.

*To all whom it may concern:*

Be it known that I, CHARLES RAMSDEN DENTON, a subject of the King of Great Britain, residing at Sheffield, in the county of York, England, have invented certain new and useful Improvements in Alloys, of which the following is a specification.

This invention relates to the manufacture of an improved alloy and has for its object to make an alloy which can be rolled, hammered, cast, stamped, brazed, or manually treated, retains its ductility, is not corroded, is untarnishable under ordinary atmospheric conditions, and well resists most acids and sea water.

The alloy is formed by melting and mixing the following metals: copper, nickel, vanadium, tin, spelter, and aluminium, in about the following proportions.

| | |
|---|---|
| Copper | 86 parts by weight. |
| Nickel | 15 parts by weight. |
| Vanadium | 1 part by weight. |
| Spelter | 12 parts by weight. |
| Tin | 7 parts by weight. |
| Aluminium | 1 part by weight. |
| | 122 parts by weight. |

The nickel and vanadium are placed in a heated crucible with about 50 parts by weight of copper, and are brought to the melting point after well stirring and mixing together and, when in a proper molten condition, the remainder of the copper is added and the whole is brought to the same molten condition as the first mixture of copper, nickel and vanadium in the crucible. To this alloy a suitable flux or fluxes is or are added and the mixture is again mixed or stirred. While the mass is in the molten state the spelter is added thereto. At the same time the mixing and heating are continued until the temperature reaches about 2,000° F., when the tin is added and the mixing and heating are continued until the temperature again reaches about 2,000° F. Then the aluminium is added and the mixing and heating are continued until the temperature again reaches about 2,000° F., when the whole is ready for pouring. All the metals are added without being previously heated.

The essential difference between this alloy and one already known is the substitution of aluminium for lead, and the addition of vanadium, thereby rendering the alloy more ductile.

Although the melting of the metals in a crucible is mentioned, they may, if desired, be melted in any suitable furnace.

What I claim is:—

1. A metallic alloy containing copper, nickel, vanadium, spelter, tin, and aluminium, as set forth.

2. A metallic alloy containing the following metals in approximately the proportions stated:—

| | |
|---|---|
| Copper | 86 parts by weight. |
| Nickel | 15 parts by weight. |
| Vanadium | 1 part by weight. |
| Spelter | 12 parts by weight. |
| Tin | 7 parts by weight. |
| Aluminium | 1 part by weight. |

3. The process of manufacturing a metallic alloy which consists in:—(1) melting a mixture of nickel, 15 parts by weight, vanadium, 1 part by weight, and copper, 50 parts by weight, (2) adding copper, 36 parts by weight, and again bringing the mixture to a molten condition, (3) adding a flux, (4) adding 12 parts by weight of spelter and heating to 2,000 degrees Fahrenheit, (5) adding 7 parts by weight of tin and heating to 2,000 degrees Fahrenheit, (6) adding 1 part by weight of aluminium and heating to 2,000 degrees Fahrenheit, substantially as set forth.

In witness whereof I have hereunto set my hand.

CHARLES RAMSDEN DENTON.